United States Patent Office 3,179,784
Patented Apr. 20, 1965

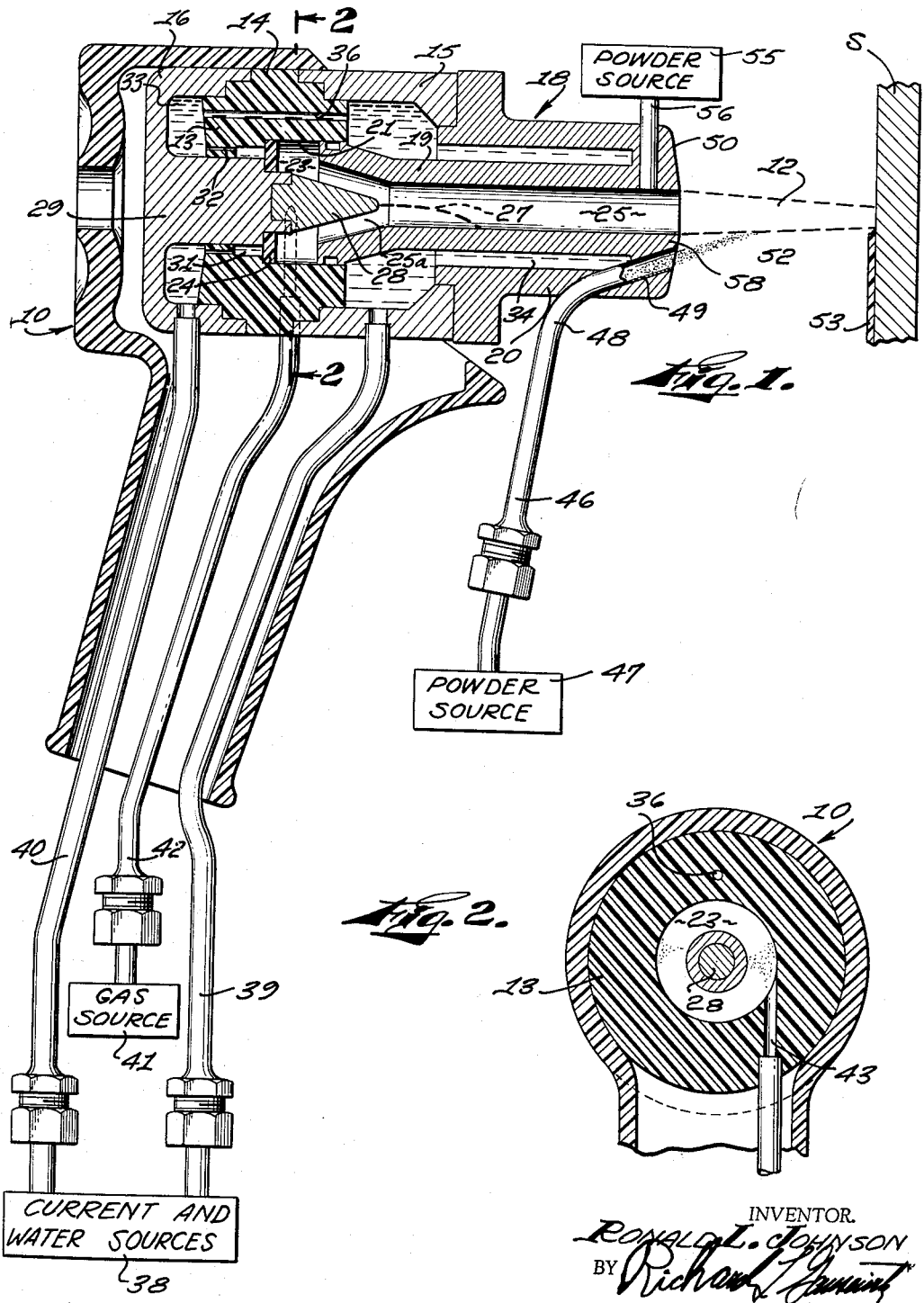

3,179,784
METHOD AND APPARATUS FOR SPRAYING PLASTICS
Ronald L. Johnson, Costa Mesa, Calif., assignor, by mesne assignments, to Giannini Scientific Corporation, Amityville, N.Y., a corporation of Delaware
Filed Dec. 20, 1962, Ser. No. 246,171
15 Claims. (Cl. 219—76)

This invention relates to a method and apparatus for spraying a plastic onto a substrate in order to form a coating thereon.

An object of the present invention is to provide a method and apparatus for effecting efficient spray-coating of various substrates with plastics such as polyethylene, polypropylene, nylon, epoxy resins, etc., without resulting in deterioration of the plastics and without causing clogging of the spray apparatus.

Another object of the present invention is to provide a plastic-spray method and apparatus which is characterized by efficient introduction of spray powder into the plasma jet, yet which does not permit sufficient radiation of heat into the spray tube to cause clogging thereof with powder.

Another object is to provide a torch for effecting spray-coating of various substrates with organic plastics, such torch incorporating water-cooled conduit means for feeding powdered plastic to the jet without causing melting of the plastic and consequent clogging of the feed conduit.

An additional object is to provide a method and apparatus for creating composite coatings and bodies formed of plastics having embedded therein particles of metals, ceramics, etc., for various purposes including formation of low-friction surfaces.

An additional object is to provide a plastic-spray method and apparatus which permits and facilitates proper control of the temperature-time parameters during transition of the powder particles from the feed hopper to the coating, so that charring and other undesirable effects may be prevented.

These and other objects will become apparent from the following detailed description taken in connection with the accompanying drawing in which:

FIGURE 1 is a longitudinal central sectional view illustrating a powder-spray torch constructed in accordance with the present invention, the powder sources being indicated schematically; and FIGURE 2 is a transverse section taken on line 2—2 of FIGURE 1 and illustrating the tangential introduction of gas into the vortex chamber.

Referring to the drawing, the powder spray torch is illustrated to comprise a unitary casing and handle 10 formed of a suitable insulating plastic. The handle portion of element 10 is hollow and is sufficiently large to receive conduits leading from suitable sources of current, water and gas. The torch is adapted, as will be described subsequently, to generate a plasma jet 12, such jet being directed toward a substrate which is indicated at S.

The apparatus further comprises an insulating body 13, formed of a suitable plastic such as a phenolic, having a central flange portion 14 the cylindrical outer wall of which abuts the interior wall of casing 10. Abutted against the forward surface of flange portion 14 is a front housing element 15 having a generally annular shape. Such element may be formed of brass or other suitable electrical conductor. Abutted against the rear surface of flange portion 14 is the rim of a generally cup-shaped rear housing element 16 which is also formed of brass or other suitable conductor.

A front electrode element 18, which is preferably formed of copper, has at the rear thereof a flange portion abutted sealingly against the front housing element 15. The front electrode is elongated, being several times the length of conventional spray electrodes. It comprises a central tubular stem portion 19 disposed coaxially within an outer tubular portion 20. Portions 19 and 20 are integral or suitably connected at the forward end of the torch but are not otherwise connected, so that water may circulate freely therethrough from within housing element 15.

At its rear end, the central stem portion 19 of the front electrode extends into the forward portion of insulating body 13, the stem having a flange portion which sealingly abuts the cylindrical interior surface 21 of such body. Surface 21 defines the outer portion of a vortex chamber 23 into which gas is introduced tangentially as will be indicated subsequently. The front portion of such vortex chamber is defined by the rear end of stem 19, whereas the rear portion of the vortex chamber is defined by a disc 24 formed of a suitable insulating material.

The vortex chamber 23 communicates with, and is coaxial with, a nozzle passage 25 which is formed centrally through the nozzle electrode 18. The indicated nozzle passage is cylindrical throughout the majority of its length, that is to say the portion thereof remote from the rear electrode, having a generally conical inlet portion 25a which is also coaxial with the vortex chamber. The nozzle passage, including the conical inlet portion 25a thereof, permits discharge of gas from the vortex chamber 23 to the ambient atmosphere in the form of the previously-indicated plasma jet 12. The temperature and other characteristics of the external component of the plasma jet depend upon several factors including the location, length and magnitude of an electric arc 27 which is maintained between the interior wall of nozzle passage 25 and the tip of a rear electrode assembly next to be described.

The rear electrode assembly includes a generally conical tip or arcing portion 28 which is co-conical with the wall of portion 25a of the nozzle passage 25, being spaced a substantial distance from such wall so that gas may discharge from the vortex chamber 23. Arcing portion 28, which may be formed to tungsten, is suitably connected to a central stem portion 29 of the rear housing element 16. Such stem portion 29 extends forwardly through a bore in body 13, and also through a somewhat smaller opening in disc 24, to the vortex chamber 23.

A counterbore 31 is provided in body 13 around the stem 29, adjacent disc 24, and communicates through passages 32 with a coolant chamber 33 which is defined by interior surface portions of rear housing element 16 and the rear radial surface of body 13. The annulus between tubular portions 19 and 20 of front electrode 18, and the space within element 15, comprise a second coolant chamber 34. The coolant chambers 33 and 34 communicate with each other through a passage 36 which extends through body 13 radially-outwardly of vortex chamber 23. The passages 32 permit circulation of water from the rear coolant chamber 33 to the annulus formed by counterbore 31, so that the forward portion of stem 29 is cooled.

Proceeding next to a description of various supply sources, and associated elements, a suitable source (or sources) of both current and water is indicated schematically at 38. Such source is connected through water-conducting cables 39 and 40 (such as insulating-plastic water conduits containing large electrical conductors) to the front and rear housing elements 15 and 16, respectively. Water is thus fed from source 38 to coolant chamber 34 in the front electrode, from which it flows through passage 36 to rear coolant chamber 33 and the associated counterbore 31, after which it discharges through the cable 40 to a suitable drain. The current source associated with the water source is normally a D.C. source adapted to deliver relatively large currents at relatively low voltages. The polarity of the source is normally such that nozzle electrode 18 is positive and rear electrode tip 28 is negative.

A suitable source 41 of gas under pressure is schematically indicated in FIGURE 1, being connected through a conduit 42 to a passage 43 (FIGURE 2) which extends through body 13 and is tangential to the gas vortex chamber 23. Gas is thus introduced from source 41 into the vortex chamber, where it whirls at substantial velocity and then passes forwardly through nozzle passage 25-25a in a vortical or helical manner.

Proceeding next to a description of the means for introducing plastic spray powder into the plasma jet 12, this comprises a powder conduit 46 connected to a suitable source 47 of powder, it being understood that the powder is propelled through the conduit 46 by means of a suitable propellant gas. Conduit 46 has a gently-curved portion 48 and a delivery end portion 49, the latter being disposed at a predetermined angle relative to the nozzle passage 25. End portion 49 terminates at the forward end surface 50 of nozzle electrode 18. Such end surface is somewhat beveled or frusto-conical.

It is emphasized that a portion of the tube end 49 is disposed in the water annulus 34, so that the tube portion 49 is cooled by means of the water circulated through the torch. Stated otherwise, the powder conduit is in heat-exchange relationship with the coolant water for the nozzle. Such cooling of the tube portion 49, and the relationship (to be described subsequently) between the tube end and the plasma jet 12, are important factors in preventing clogging of the tube with plastic powder.

The angle between tube end 49 and the nozzle passage 25 is such that the plastic powder (indicated at 52) converges forwardly toward plasma jet 12 at an acute angle which is substantially less than ninety degrees. More specifically, the angle of convergence is between fifteen and thirty degrees, being preferably approximately twenty-two degrees. Such angle, and the distance (along face 50) between the extreme forward end of the powder conduit and jet 12, are such that powder 52 merges with the jet at a region spaced from the nozzle, intermediate the nozzle and substrate S. The powder is heated and melted by the jet, and re-solidifies on the substrate S in the form of a coating which is indicated at 53.

It is pointed out that more than one powder source 47 and associated conduit 46 may be employed. For example, an identical system (the mirror image of the present one) may be provided on the diametrically opposite side of nozzle passage 25.

When it is desired to form mixtures of plastic with various metals, ceramics, etc., an additional powder source may be provided as indicated at 55. Such source communicates through a conduit 56 with the nozzle passage 25, preferably adjacent the downstream end thereof. When powder is introduced from source 55 through conduit 56 into nozzle passage 25, the jet 12 contains particles of metal or ceramic (or other additional substance) by the time it is engaged by the stream of powder 52. Such additional substance may or may not be molten. It follows that the metal, ceramic, etc., and the plastic powder are deposited on substrate S in a homogeneous mixture. It is also possible to introduce additional substance into the jet in other ways, for example in rod or wire form.

*Summary of the method*

In performing the method of the invention, gas source 41 may be applied to introduce arc gas through conduit 42 and tangential passage 43 into the vortex chamber 23. Such gas flows vortically in such chamber and then passes forwardly and helically through passage portion 25a out nozzle passage 25. The current and water sources 38 are then applied, and suitable means are employed to initiate the electric arc 27 between the tip of rear electrode 28 and the wall of nozzle passage 25. The voltage and current of the arc 27, the rate of gas flow, etc., are adjusted to regulate the temperature and other characteristics of the plasma jet 12. The manner of regulation is such that the temperature of jet 12, at the region where plastic powder 52 enters the same, will be sufficiently high to melt the powder but insufficiently high to effect charring, premature polymerization, or other undesired effects. The water which is circulated through the conduits 39 and 40, and through chambers 33, 34, etc., effects cooling not only of the electrodes but also of the delivery portion 49 of the plastic powder tube 46.

Powder source 47 is then applied, the powder being propelled by a suitable gas so that it discharges from the conduit end portion 49 as indicated at 52. The powder stream converges into and merges with the plasma jet 12, entering the same so that the powder particles are melted and applied to substrate S to form coating 53 thereon.

It would be normal to suppose that the most advantageous manner of delivering the powder to jet 12 would be to inject the powder into the nozzle passage 25, or else to position the tube portion 49 perpendicularly to the external portion of jet 12. The first of these alternatives is normally only successful for short periods of time, however, since radiation from the plasma causes powder to melt while still within the tube, so that the tube becomes clogged with plastic. The second of the above-indicated alternative methods is unsatisfactory for the reason that the powder (which is light in weight) merely bounces away from the jet 12, that is to say the powder splits and passes around the jet instead of penetrating the same. Accordingly, excessive quantities of powder are lost.

In accordance with the present method, the powder which converges toward the jet becomes efficiently and effectively entrained therein, no excessive portion thereof being lost due to lack of penetration into the jet. Furthermore, the amount of radiation from the jet 12 into the tip of delivery portion 49 is insufficient to melt plastic which is still within such portion, so that the delivery tube never becomes clogged with powder. Thus, continuous operation is made possible.

One reason for the relatively small amount of radiation to the end of delivery portion 49 is that such portion is directed toward a part of the jet 12 which is spaced substantially away from the nozzle electrode, such part being relatively cool in comparison with the plasma passing through the nozzle passage 25. Furthermore, the angle between the tube portion 49 and the jet is such that only a relatively small component of the radiation enters the delivery tube. Also, the end of the delivery tube, which is flush with the beveled or frustoconical face 50, is in the shadow of the indicated portion 58 of the nozzle, so that a major component of radiation (perpendicular to the jet) does not enter the tube.

The additional powder source 55 may, if desired, be employed to introduce powdered substance into the plasma jet 12, for example by injection into the passage 25. Such additional substance may or may not be melted by the plasma, depending upon the type of coating which it is desired to apply to the substrate S.

The plastic powder should be relatively small in size, for example minus 100 mesh. The velocity of the jet 12 may be great, such as 300 to 500 feet per second, facilitating control of the temperature to which the plastic is heated and the time during which the plastic is in contact with the jet. Various gases may be delivered from source 41, for example argon, helium, and nitrogen. The same or other gases may be employed as propellants for the powder.

It has been found that the coating 53 may have high dielectric strength, this being because the dielectric properties of the plastic are not adversely affected by the spray procedure. There are no pin holes in the coating. No additional treatment of the coating is necessary.

The substrate S may comprise mild steel, aluminum, brass, ceramics, different plastics, and many other substances. The coatings may have thicknesses as low as one or two mils and as high as one-quarter inch or greater. The tolerances maintained relative to thickness of the coating may be small, such as one mil.

One of the numerous substances which may be applied by the present method is "Penton" (trademark of Hercules Powder Company), a chlorinated polyether compound having a melting point of 380° F. The structure of such compound is as follows:

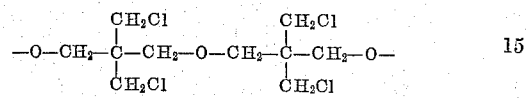

The plastic powder is melted by the jet and wets the substrate S, so that upon resolidification the plastic becomes hardened to form a dense pin-hole free surface coating. No additional curing is required, the coating being ready for use shortly after application. The coating deposited during a single pass may be between five and thirty thousandths of an inch or greater. The surface preparation of substrate S, for spraying with "Penton" and various other plastics, may be effected by grit blasting and then washing with a suitable chemical solvent.

In spraying "Penton," when argon is employed for the arc gas, a preferred range of current is 150 to 300 amperes, the voltage being in the range of 25 to 30 volts. The rate of argon gas flow from source 41 is preferably between 30 and 40 standard cubic feet per hour. The rate of flow of argon carrier gas from powder source 47 is in the range of 20 to 30 standard cubic feet per hour. The distance between surface 50 and substrate S should be between about two inches and about four inches, the rate of traverse of the torch relative to the substrate being between 75 and 200 inches per minute. The internal diameter of the tube 49 is 0.189 inch, the diameter of passage 25 is $11/32$ inch, and the length of such passage (including part 25a) is 2.8 inches.

Where nitrogen is employed as the arc gas, the "Penton" may be applied by utilizing an arc current which is preferably between 25 and 100 amperes, at 70 to 80 volts. The rate of nitrogen gas flow from source 41 may be from 40 to 60 standard cubic feet per hour, whereas the rate of nitrogen gas flow from source 47 may be between 30 and 40 standard cubic feet per hour. The distance between the surface 50 and the substrate S may be between four and eight inches, the rate of traverse being between one and two hundred inches per minute. The torch dimensions are the same as given in the preceding paragraph.

The term "plastics" is employed in the present specification and claims in the same manner that it is employed by the general public and in industry, denoting a certain group of substances representative ones of which have been specified above. The term is not employed merely to mean "pliant" or "malleable," and is not intended to comprehend such substances as soft metals. In particular, the term relates to organic substances of the type generally referred to as plastics, and which are susceptible to fluidized-bed coating techniques.

The foregoing detailed description is to be clearly understood as given by way of illustration and example only, the spirit and scope of this invention being limited solely by the appended claims.

I claim:

1. A method of creating a plastic coating on a substrate, comprising
   providing an electrical plasma-jet torch,
   directing the plasma jet from said torch toward a substrate,
   and introducing a plastic powder into said jet at a region between said torch and said substrate.

2. A method of applying a plastic coating to a substrate, comprising
   providing an electrical plasma-jet torch,
   directing the plasma jet from said torch to the vicinity of a substrate,
   and introducing a stream of plastic spray powder entrained in a propellent gas into said jet at a region between said torch and said substrate,
   the direction of said stream of plastic spray powder and propellent gas being at an acute angle relative to the direction of said jet and converging with said jet in a direction toward said substrate.

3. The invention as claimed in claim 2, in which
   said acute angle is substantially less than ninety degrees.

4. The invention as claimed in claim 2, in which
   said acute angle is between about fifteen degrees and about thirty degrees.

5. A method of spraying plastic, which comprises
   providing an electrical plasma-jet torch having a nozzle electrode and a back electrode,
   supplying gas to said torch for discharge through said nozzle electrode,
   maintaining an electric arc in said torch to effect heating of said gas whereby to generate plasma which discharges from the nozzle passage in said nozzle electrode in the form of a jet,
   effecting water cooling of said nozzle electrode, passing a stream of plastic powder entrained in propellent gas through said nozzle electrode in heat-exchange relationship relative to the water coolant therefor,
   directing said stream toward said jet in convergent relationship and in such manner that said stream enters said jet at a region spaced from said nozzle electrode,
   and regulating factors including the electrical power supplied to said torch and the rate of flow of gas through said torch to cause said plasma jet to have, at the region thereof penetrated by said plastic, a temperature sufficiently high to melt said plastic but insufficiently high to effect deterioration thereof.

6. The invention as claimed in claim 5, in which
   the convergence angle between said stream and said plasma jet is on the order of twenty-two degrees.

7. The invention as claimed in claim 5, in which said method further comprises
   injecting into said nozzle passage a substance which it is desired to mix with said plastic.

8. The invention as claimed in claim 5, in which said method further comprises
   directing said plasma jet and contained plastic substance toward a substrate,
   and so positioning said torch relative to said substrate that the region of convergence between said stream and said jet is generally midway between said nozzle electrode and said substrate.

9. A method of applying a composite substance onto a substrate, which comprises
   providing an electrical plasma-jet spray torch,
   directing the plasma jet from said torch toward a substrate,
   introducing into said plasma jet at a region between said torch and said substrate a plastic which it is desired to apply to said substrate,
   and introducing into said jet a non-plastic substance which it is desired to mix with said plastic for application to said substrate, thereby creating on said substrate a mixture of plastic and non-plastic substances.

10. Apparatus for effecting spray-coating of a plastic onto a substrate, which comprises
    an electrical plasma-jet torch having a nozzle electrode and a rear electrode, said nozzle electrode having an elongated nozzle passage therein, said rear electrode having a portion introduced into one end of said nozzle passage, means to pass water through said nozzle electrode to effect cooling of the wall of said nozzle passage, means to pass arc gas between said rear electrode and said nozzle electrode for flow through said nozzle passage, means to maintain an electric arc between said rear electrode and said nozzle electrode, said arc extending through at least a portion of said nozzle passage and effecting heating of said arc gas to thereby create a plasma jet, spray-powder conduit means extending through said nozzle electrode in heat-exchange relationship relative to the water therein, the discharge portion of said conduit means being adjacent the front end of said nozzle electrode and spaced from said nozzle passage, said discharge portion of said conduit means being disposed at an acute angle relative to said nozzle passage and converging toward said jet, and means to introduce plastic powder and propellent gas into said conduit means for passage through said nozzle electrode and introduction into said jet.

11. The invention as claimed in claim 10, in which means are provided to shield said discharge portion of said conduit means from radiation from the external portion of said jet adjacent said nozzle electrode.

12. The invention as claimed in claim 10, in which means are provided to introduce an additional substance into said plasma jet for mixture with said plastic powder.

13. The invention as claimed in claim 12, in which said means is adapted to inject substance through said nozzle electrode and into said nozzle passage.

14. The invention as claimed in claim 10, in which means are provided to effect flow of said arc gas vortically around said rear electrode and helically through said nozzle passage.

15. Apparatus for effecting spraying of a plastic onto a substrate, comprising an electrical plasma-jet spray torch having a nozzle and a rear electrode, said nozzle being elongated whereby the passage therethrough is a plurality of times the length of a normal nozzle passage in a plasma-jet spray torch, means to maintain an electric arc between said rear electrode and at least a portion of the wall of said nozzle passage, means to pass gas through said nozzle passage, and means to introduce into the plasma jet discharging from said nozzle passage a plastic powder, said last-named means introducing said powder into said jet at a region spaced from the downstream end of said nozzle passage.

References Cited by the Examiner

UNITED STATES PATENTS 2,973,426  2/61  Casey _____ 219—75
3,010,009  11/61  Ducati _____ 219—76

RICHARD M. WOOD, *Primary Examiner.*